Feb. 3, 1959 S. J. STEIN 2,872,341
METHOD OF PROVIDING AN ADHERENT METAL COATING
ON A FLUOROCARBON RESIN
Filed Sept. 10, 1954

INVENTOR.
SIDNEY J. STEIN
BY
Donald S. Cohen
ATTORNEY

United States Patent Office 2,872,341
Patented Feb. 3, 1959

2,872,341

METHOD OF PROVIDING AN ADHERENT METAL COATING ON A FLUOROCARBON RESIN

Sidney J. Stein, Philadelphia, Pa., assignor to International Resistance Company, Philadelphia, Pa.

Application September 10, 1954, Serial No. 455,292

9 Claims. (Cl. 117—47)

This invention relates to a method of evaporating metals on certain plastic materials and the products resulting therefrom. More specifically, it relates to a method of evaporating metals on the fluorocarbon resin plastics, such as polytetrafluoroethylene and polytrifluorochloroethylene.

Due to the good electrical insulation properties and the mechanical strength of the fluorocarbon resin plastics, they have many uses in the electrical field. They can be used as the base material for printed circuits where a layer of the plastic is coated with an electrically conducting metal in a desired pattern to which electrical components are attached to form a circuit. They may also be used as the dielectric material for capacitors and for hermetic sealing elements for terminal wires of electrical components and equipment where the terminal wires pass through an opening in a casing or housing.

A great disadvantage in the use of the fluorocarbon resin plastics for these purposes is that the plastics do not readily adhere directly to metals. Therefore it is very difficult to obtain a strong bond between metals and such plastics. One well known method of coating various materials with a metal is by thermal evaporation of the metal in a vacuum. When the fluorocarbon resin plastics are thus coated, using standard techniques, the metal layer formed peels off easily. In fact, the metal layer usually strips off the plastic by merely applying a cellophane adhesive tape to the metal layer and then removing the tape.

It is an object of this invention to provide a method of coating fluorocarbon plastics with a strongly adhering layer of a metal. A further object is to provide a method of coating fluorocarbon resin plastics with a strongly adhering layer of a metal by thermal evaporation of the metal in a vacuum. Another object is to provide a laminated article comprising a layer of a fluorocarbon resin plastic with a layer of a metal strongly adhered directly to the plastic layer. Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which.

Figure 1:
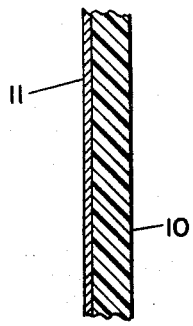
Figure 1 is a section through a laminated article made by the method of this invention.

Referring to Figure 1 the article made by the method of this invention comprises a layer 10 of plastic which is a solid polymer of a fluorocarbon resin, such as polytetrafluoroethylene or polytrifluorochloroethylene and a metal layer 11 adhered directly to at least one surface of the plastic layer 10. The metal may be copper, silver, nickel, aluminum or any other metal capable of evaporation under practical conditions. Although plastic layer 10 is shown coated on only one side, it may be coated on both sides if desired. Also the plastic layer 10 is not flat of necessity; it may be cylindrical such as the insulation on a wire.

Generally speaking, the method of this invention for forming a strongly adherent metal film on a layer of a fluorocorban resin may be described as follows: The plastic article to be coated is placed in a vacuum chamber. The chamber is evaporated to a vacuum suitable for thermal evaporation. This vacuum should be at a pressure no greater than $10^{-3}$ millimeters of mercury, although it is preferred to have a pressure about $10^{-5}$ millimeters of mercury. The plastic article surface to be coated is then heated until the surface thereof besomes soft. For the crystalline plastics this is the transition point where the crystallites melt and is distinguished by the plastic becoming more translucent. The temperature of the heated surface at the transition point is about 300° C. for polytetrafluoroethylene and about 220° C. for polytrifluorochloroethylene, although these temperatures vary somewhat for different pieces of plastic according to the amount of crystallinity and the size of the crystals. The heat is directed at the surface to be coated so that it becomes soft first. The remaining portion of the article is left at a lower temperature and still hard so that it will support the soft surface to be coated. The coating metal is next deposited on the heated surface of the plastic article by thermal evaporation, this being usually done by heating the metal in the vacuum chamber until it evaporates, spreading its vapors throughout the chamber. That vapor which contacts the surface of the article condenses to form a layer of the metal bonded thereo. As is well known in the art, the temperature necessary to vaporize the metal varies with each metal used.

Figure 2:
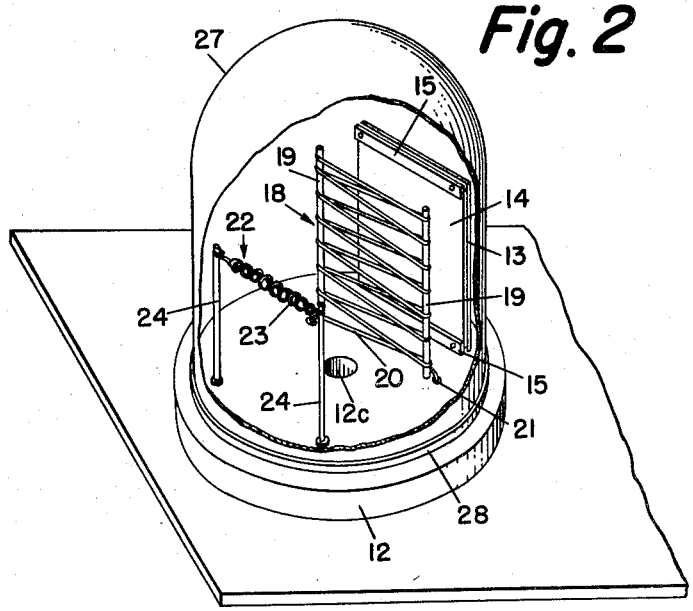
Figure 2 is a perspective view partially broken away of an apparatus which may be used to carry out the method.
Figure 3:
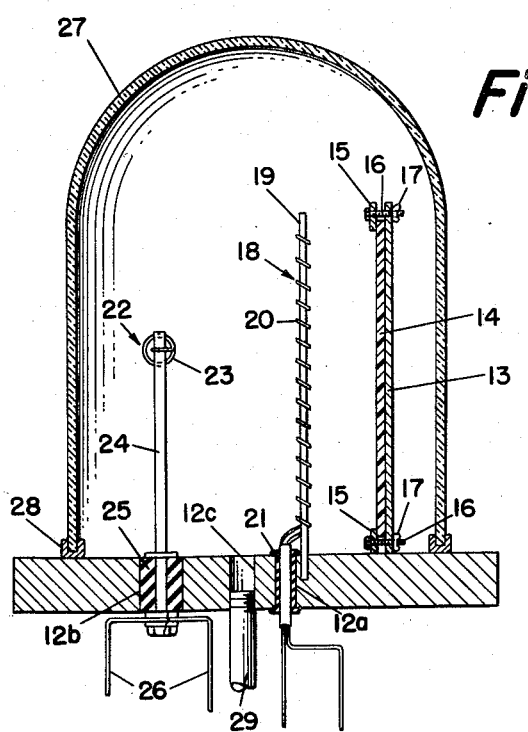
Figure 3 is a vertical-sectional view through the apparatus shown in Figure 2.

Apparatus suitable for use in carrying out the above described method is shown in Figures 2 and 3 wherein a base member 12 has mounted thereon a vertically arranged supporting plate 13 for holding the plastic article 14 to be coated. Clamping plates 15 secured to supporting plate 13 by bolts 16 and nuts 17 hold plastic article 14 in position on supporting plate 13. A heating device 18 is mounted on base member 12 adjacent the surface of the plastic article 14 to be coated. The heating device 18 comprises a pair of vertical supporting posts 19 mounted in the base member 12 with a heater wire 20, such as Nichrome, strung therebetween. The ends of the wire 20 extend through an insulating bushing 21 seated in a hole 12a in base member 12 and are suitably connected in an electric circuit (not shown). A metal evaporating device generally indicated at 22 is mounted on base member 12 spaced from but facing the surface of the plastic article 14 to be coated. This device 22 comprises a helically wound wire filament 23 coated with the metal to be evaporated and connected between supporting posts 24. Thus wire filament may be of molybdenum, tungsten or any other electrical resistance type metal having a temperature of evaporation higher than that of the metal to be evaporated. Supporting posts 24 are made of an electrically conducting metal and extend through insulating bushing 25 seated in holes 12b in base member 12. Wires 26 are connected to the ends of the posts 24 and to a source of electricity (not shown). A glass bell jar 27 fits over and around article support 13, heating device 18 and metal evaporation device 22 and rests on the base member 12. The bottom edge of jar 27 is fitted with a gasket 28 acting as a seal with the base member. Thus there is formed a sealed chamber containing the supported plastic article 14, the heating device 18 and the metal evaporation device 22. A hole 12c in base member 12 opening into the chamber is connected to a pipe 29 secured in turn connected to evacuating apparatus, such as a vacuum pump (not shown). The lines from heating device 18 and evaporating device 20 may contain controls, such as rheostats, to regulate the temperature of wire 20 and filament 23. Pipe 29 may include valves and gauges to control the pressure in the chamber.

In operation, plastic article 14 is clamped against the support 13, the bell jar 27 is seated on base member 12 and the chamber is evacuated to a pressure suitable for thermal evaporation of metal being used. As previously stated, this pressure should be at least $10^{-3}$ millimeters of mercury and preferably about $10^{-5}$ millimeters of mercury. The heating device 18 is then turned on and the plastic article 14 heated until the moment when only the surface to be coated becomes soft. For the crystalline plastic this is when the plastic becomes more translucent. The evaporation filament 23 is then heated to evaporation temperature which is usually accomplished in a few seconds. However, if desired, while the plastic article is being heated the filament 23 may be brought to a temperature just below the evaporation temperature and then brought up to the final temperature as soon as the surface of the article becomes soft. The heating element may be either on or off during the evaporation. The evaporated metal condenses on the hot surface of the plastic article 14 to form a metal layer thereon. The exact phenomena transpiring as the metal condenses on the surface of the article 14 is not known but there is reason to believe that some of the metal may actually penetrate the heated surface and become embedded therein due to the high velocities of the metal vapor in the vacuum chamber. As previously stated, the plastic article 14 should be heated only until the surface becomes soft so that the rest of the article will remain stiff to support the heated surface. Keeping the body of the plastic article stiff may be facilitated by making the article supporting plate 13 of a good heat conducting metal to cool the back of the plastic article.

In use wire 20 of heating device 18 may shadow the surface of article 14 to prevent uniform coating thereof. One method of overcoming such shadowing is to use additional evaporating filaments located at different positions so that the portions of the article shadowed with respect to one filament will not be shadowed with respect to another filament. Another method of solving this difficulty is to replace the single heating device with a plurality of heating units positioned around and off to the sides of the plastic article so that there will be no obstructions between the article and the evaporating filament. If the coating is to be in the form of a pattern, such as in making electrical circuit designs, a mask may be placed in front of the plastic article to allow only desired portions of the article to be coated.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. The method of coating a surface of an article of a solid polymer of a fluorocarbon resin with a metal comprising the steps of placing the article in a vacuum chamber, evacuating the chamber to a vacuum suitable for thermal evaporation of said metal, heating the surface to be coated until it becomes soft and then depositing a layer of said metal upon the heated surface by thermal evaporation within the chamber.

2. The method of coating a surface of an article of a solid polymer of a fluorocarbon resin with a metal comprising the steps of placing the article in a vacuum chamber, evacuating the chamber to a vacuum suitable for thermal evaporation of said metal, heating the surface to be coated to at least the transition point of the fluorocarbon resin and then depositing a layer of said metal upon the heated surface by thermal evaporation within the chamber.

3. The method of coating a surface of an article of a solid polymer of a fluorocarbon resin with a metal comprising the steps of placing the article in a vacuum chamber, evacuating the chamber to a vacuum suitable for thermal evaporation of said metal, heating the surface to be coated until the resin becomes more translucent, and then depositing a layer of said metal upon the heated surface by thermal evaporation within the chamber.

4. The method of coating a surface of an article of a solid polymer of a fluorocarbon resin with a metal comprising the steps of placing the article in a vacuum chamber, evacuating the chamber to a vacuum suitable for thermal evaporation of said metal, heating the article until only the surface to be coated becomes more translucent, and then depositing a layer of said metal upon said surface by thermal evaporation within the chamber.

5. The method of coating a surface of a solid polymer of a fluorocarbon resin with a metal comprising the steps of heating the article until the surface thereof becomes soft and evaporating the metal in the presence of said surface to deposit a layer of said metal on said surface.

6. The method of coating a surface of a solid polymer of a fluorocarbon resin with a metal comprising the steps of heating the article until the surface thereof reaches the transition point of said resin, and evaporating the metal in the presence of said surface to deposit a layer of said metal on said surface.

7. The method defined in claim 5 in which only the surface of said article to be coated is heated to a greater translucency.

8. The method defined in claim 5 in which the steps are accomplished in a rarefied atmosphere.

9. The method defined in claim 5 in which the steps are performed in an atmosphere of $10^{-3}$ millimeters of mercury or less.

References Cited in the file of this patent

UNITED STATES PATENTS

| 2,622,041 | Godley | Dec. 16, 1952 |
| 2,689,805 | Croze et al. | Sept. 21, 1954 |

FOREIGN PATENTS

| 686,031 | Great Britain | Jan. 14, 1953 |

OTHER REFERENCES

Plastics, Du Pont, July 1946, page 34.